US008449941B2

(12) United States Patent
Kim et al.

(10) Patent No.: US 8,449,941 B2
(45) Date of Patent: May 28, 2013

(54) METHOD FOR FORMING THERMAL BARRIER COATING ON HOT-GAS-PATH COMPONENTS OF GAS TURBINE DURING OPERATION

(75) Inventors: Min Tae Kim, Daejeon (KR); Doo Soo Kim, Daejeon (KR); Won Young Oh, Daejeon (KR)

(73) Assignees: Korea Electric Power Corporation, Seoul (KR); Korea Southern Power Co., Ltd, Seoul (KR)

( * ) Notice: Subject to any disclaimer, the term of this patent is extended or adjusted under 35 U.S.C. 154(b) by 575 days.

(21) Appl. No.: 12/616,128

(22) Filed: Nov. 10, 2009

(65) Prior Publication Data

US 2010/0330294 A1 Dec. 30, 2010

(30) Foreign Application Priority Data

Jun. 29, 2009 (KR) .................. 10-2009-0058581

(51) Int. Cl.
*C23C 16/00* (2006.01)
(52) U.S. Cl.
USPC ............. 427/255.15; 427/255.18; 427/255.11
(58) Field of Classification Search
USPC ............. 427/255.11, 255.14, 255.15, 255.18, 427/255.19, 140, 142, 249.1, 249.15, 372.2, 427/376.1, 376.2, 397.7
See application file for complete search history.

(56) References Cited

U.S. PATENT DOCUMENTS

| 4,466,997 A | 8/1984 | Prescott |
| 2008/0107810 A1* | 5/2008 | Kim et al. ............... 427/251 |

FOREIGN PATENT DOCUMENTS

| EP | 0 048 910 | 4/1982 |
| EP | 1 031 546 | 8/2000 |
| KR | 10-0855703 | 9/2008 |

OTHER PUBLICATIONS

Willi Pabst, et al., "A New Percolation—Threshold Relation for the Porosity Dependence of Thermal Conductivity", Ceramics International, vol. 32, Issue 1, pp. 89-91, (2006).
Srinivasan Raghavan, et al., "The Effect of Grain Size, Porosity and Yttria Content on the Thermal Conductivity of Nanocrystalline Zirconia", Scripta Materialia, vol. 39, Issue 8, pp. 1119-1125, (1998).

* cited by examiner

*Primary Examiner* — Dah-Wei Yuan
*Assistant Examiner* — Nga Leung V Law
(74) *Attorney, Agent, or Firm* — McDermott Will & Emery LLP (57) ABSTRACT

Disclosed is a method for formation of a thermal bather coating on a gas turbine during operation thereof, which includes addition of an organic compound containing silicon to a fuel under a first condition in order to form a base layer on the surface of a part coming into contact with a combustion gas of the fuel in the gas turbine during operation thereof, as well as addition of the organic compound containing silicon to the fuel under a second condition in order to form a porous layer having more pores than the base layer above the base layer.

6 Claims, 7 Drawing Sheets

METHOD FOR FORMING THERMAL BARRIER COATING ON HOT-GAS-PATH COMPONENTS OF GAS TURBINE DURING OPERATION

BACKGROUND OF THE INVENTION

1. Field of the Invention

The present invention relates to a method for coating metal parts of a gas turbine with oxidation-resistant and thermal barrier oxides during operation thereof, by adding an additive to a fuel of the gas turbine in order to protect the metal parts exposed to a hot combustion gas from heat during operation.

2. Description of the Related Art

In order to improve thermal efficiency of a system, a gas turbine for aircraft or power generation plants is generally operated at a turbine inlet temperature (TIT) or a combustion temperature of not less than 1,000° C. Under such operational conditions, some parts or components of a gas turbine directly coming into contact with a hot combustion gas are mostly fabricated using nickel-based super-alloys with high thermal resistance. For operation at a high temperature of 1,000° C. or more for a long term, an additional bond-coating (MCrAlY, wherein M is Ni or Co) or bond-coating and zirconia ($ZrO_2$)-based thermal bather coating is applied to a component such as a first stage blade, a vein, a combustion can, and the like in a thickness of above 200 µm.

However, the component such as the first stage blade coming into contact with a hot gas at more than 1,000° C. is fabricated in a complicated form and is subjected to rotary motion, entailing a problem in that the component may not be coated with a thickness of more than 250 µm and, in turn, has restrictions in thermal barrier efficiency (in this case, a thermal bather temperature does not exceed 200° C.). If a thermal carrier coating is stripped or released due to preparation failure of a coating or deterioration of a coating caused by using the same for a long time, metal components covered by the coating are rapidly deteriorated or damaged. Also, a zirconia-based thermal carrier coating cannot effectively shield oxygen contained in a combustion gas and, therefore, the oxygen penetrates through TBC and causes oxidation and deterioration of a bond coating, resulting in release of the coating. In view of coating formation, such a TBC provided during fabrication of gas turbine components requires an additional process, apparatus and/or human labor to apply a coating material to the components and has other drawbacks such as extended period for fabrication of components, high unit cost of production, etc.

An idea or concept that a corrosion-resistant and oxidation-resistant coating is spontaneously formed over a thermal component (such as hot-gas-path component) of a gas turbine by addition of an inorganic or organic compound containing metal ingredients such as silicon to a fuel such as LNG or light oil (diesel) and combustion thereof together with the fuel, has been disclosed in U.S. Pat. No. 4,466,997, entitled "Method of maintaining and repairing protective coatings for the high temperature zones of engines," EP Laid-Open Application No. 0048910A1, entitled "Protective coatings for the high temperature zones of engines," EP Laid-Open Application No. 1031546A1, entitled "Method to prevent recession loss of silica and silicon-containing materials in combustion gas environments," and so forth. According to the foregoing techniques, different metal substances including silicon organic compounds such as silicon, boron, barium, magnesium, calcium titanium compounds, etc., which were added to a fuel, are oxidized using heat of combustion during operation of a gas turbine, and the obtained oxides are applied to a component of an engine coming into contact with a combustion gas in order to protect the existing coating or to regenerate the same (see EP Laid-Open Application No. 0048910A1). EP Laid-Open Application No. 1031546A1 also describes that, if the existing coating (obtained during fabrication of the component) is silica or a surface oxide layer containing silicon of the component is silica, loss of the silica during operation of the gas turbine, which is caused by reaction of the silica with moisture in the combustion gas, is effectively prevented.

The foregoing patent and applications have something in common that an additive is used to enable an oxide coating generated by combustion of a fuel additive to supplement loss of the existing coating. Moreover, these procedures have not disclosed further performance of a new coating obtained using the additive or a material structure of the coating, or physical properties thereof, etc. U.S. Pat. No. 4,466,997 or EP Laid-Open Application No. 0048910A1 have not described exemplary embodiments in relation to formation of a coating for an actual gas turbine. On the other hand, although EP Laid-Open Application No. 1031546A1 included some examples in relation to increase or decrease in weight of a silicon carbide coupon with a size of 1 inch×1 inch×0.5 inch, no measurement or evaluation of a coating formed around an actual gas turbine is disclosed.

Therefore, practical performance and/or functions of an oxide coating containing a fuel additive are unknown by the above conventional technologies. Moreover, the foregoing patent and applications do not disclose specific conditions for formation of a thermal carrier coating. Meanwhile, Korean Patent No. 10-0855703, entitled "Method for formation of a corrosion-resistant and oxidation-resistant coating on a heat resistant component of a gas turbine using a fuel additive," includes an example for formation of a silica coating over a turbine blade of an actual gas turbine. However, this patent does not describe in detail specific conditions for formation of a coating in association with amount of an additive, evaluation or measurement of corrosion-resistance or oxidation resistance of the formed coating, optimal coating conditions based on the evaluated results, and so forth. In addition, thermal bather performance of the coating is not mentioned therein.

SUMMARY OF THE INVENTION

Therefore, the present invention is directed to solving the above problems and it is an object of the present invention to provide a novel method for formation of a thermal bather coating (hereinafter, referred to as "TBC") during operation of a gas turbine, which is distinguishable from conventional procedures.

Another object of the present invention is to provide a coating with improved thermal barrier performance and oxidation resistance, which includes a compact base layer having fewer pores at a bottom of the coating thereof and a porous layer laminated on the base layer.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

According to an exemplary embodiment of the present invention in order to accomplish the above purposes, there is provided a method for formation of a TBC on a gas turbine during operation thereof, comprising: adding an organic compound containing silicon such as tetraethyl orthosilicate (TEOS, $C_8H_{20}O_4Si$) to a gaseous fuel such as LNG or a liquid fuel such as light oil (diesel) in a certain amount; and burning the additive together with the fuel for a certain period of time, so as to protect a thermal constitutional component of the gas turbine from a combustion gas, especially, to shield heat and oxygen of the combustion gas and to improve heat resistance of the component, wherein the gas turbine is operated at a high temperature of 800 to 1,500° C. in terms of turbine inlet temperature ("TIT"). During operation, a silicon dioxide layer with a compact and porous double-structure may be formed over all thermal components of the gas turbine coming into contact with a hot combustion gas, wherein the silicon dioxide layer exhibits excellent oxidation resistance and thermal barrier performance as well as favorable adhesiveness at a thickness of several μm.

The fuel additive may comprise a silicon organic compound evaporated at a considerably low temperature. An organic compound containing oxygen such as TEOS having oxygen bonded to silicon (with a boiling point of 168° C.) is more preferably used. The reason for this is that a silicon-based organic compound with a combined structure of oxygen and silicon in a molecule of the compound enables easy formation of a more uniform silicon oxide coating and, in addition, fabrication of a porous coating layer with high porosity so as to decrease thermal conductivity and to exhibit improved thermal carrier performance.

When the silicon organic compound described above is subjected to combustion together with the fuel, the compound may be separately fed to a combustion chamber independent of the fuel or, otherwise, may be sprayed into a fuel feed line immediately before the combustion chamber. If an additive is fed through an inlet for combustion air and sprayed into the fuel feed line, the additive may adversely influence a compressor of a gas turbine and/or may be inhaled into a cooling hole of a large-scale gas turbine, causing formation of a coating at an undesired site. On the other hand, when the additive is directly combined with a liquid fuel such as diesel, the additive is continuously fed into the fuel during operation of a gas turbine which in turn causes excessive growth of a coating layer, resulting in a coating with a thickness of more than a desired level. As a result, the formed coating is released from a surface of a component of the gas turbine and may adversely influence a gas turbine system. Moreover, in order to more uniformly introduce a liquid additive into a combustion chamber containing a gaseous fuel such as LNG, the additive may be evaporated beforehand then fed together with the gaseous fuel into the chamber. Alternatively, the additive may be combined with a liquid fuel in a diluted state then introduced into the chamber.

In order to form a compact base layer using the fuel additive, the number of moles (by %) of silicon contained in an organic compound as the additive (for TEOS, the number of moles of TEOS) relative to moles of carbon as a major ingredient of the fuel may range 0.01 to 0.05 mol %, preferably, 0.01 to 0.03 mol %. If the number of moles exceeds 0.05 mol %, a porous coating layer is liable to be formed. In contrast, when the number of moles is less than 0.01 mol %, a component of the gas turbine made of metal ingredients without coating is liable to suffer damage caused by oxidation of the component before a coating is sufficiently formed over the component.

In order to form a porous silicon dioxide layer above a compact base layer using the foregoing fuel additive, the number of moles of silicon contained in an organic compound as the fuel additive relative to moles of carbon as a major ingredient of a fuel may range from 0.05 to 1 mol %, more preferably 0.1 to 0.5 mol %. If the number of moles exceeds 1 mol %, the gas turbine shows unstable combustion performance, a coating is non-uniformly formed within a short period of time, and the coating excessively grown over a certain thickness is easily released from the component. On the other hand, when the number of moles is less than 0.05 mol %, a porosity of the coating is low, decreasing thermal barrier effects thereof.

As for combustion of the fuel additive together with the fuel, a feed time of the additive, that is, a time of introducing the additive into a gas turbine and operating the same may range from 2 to 100 minutes, preferably, 5 to 50 minutes. Such a time may be varied depending on an amount of the additive, that is, the number of moles (mol %) of silicon contained in the additive relative to moles of carbon in the fuel. When the number of moles is 0.02 mol %, the operation time may range from 50 to 100 minutes. In contrast, the operation time may range from 10 to 20 minutes as the number of moles is 0.1 mol %. If the time is too short, the coating is not sufficiently performed. As the time becomes too long, a non-uniform coating with a thickness over a constant value is produced.

As for the coating with a double structure formed as described above, a thickness of the compact base layer may range from 1 to 5 μm, preferably 2 to 3 μm. If the base layer is too thin, oxygen or metal ions may be easily penetrated through the base layer which in turn results only in slightly improved oxidation resistance. When the base layer is too thick, the coating is liable to be released due to internal stress of the coating layer or external stress caused by difference in thermal expansion coefficients between the coating and a metal base. An external coating layer of the above coating having a double structure may have porosity of about 60%. The coating with porosity of more than 60% exhibits considerably reduced thermal conductivity and excellent thermal bather performance even when a thickness of the coating is low. Additionally, the high porosity coating may prevent occurrence of stress caused by difference in thermal expansion coefficients between the coating and a metal base. Pabst and Eva Gregorov, et al. disclosed in "A new percolation-threshold relation for the porosity dependence of thermal conductivity," in Ceramics International 32 (2006) 89-91 that thermal conductivity κ of a porous ceramic material is represented by the following equation:

$$\kappa = \kappa 0 (1-\phi/2)(1-\phi/\phi C)$$

wherein κ0=thermal conductivity of a material with porosity of 0, ϕ=porosity, and ϕC=critical porosity.

As the porosity is higher than the critical porosity, thermal conductivity is drastically reduced. According to Raghavan et al., "The Effect of Grain Size, Porosity and yttrium content on the thermal conductivity of non-crystalline zirconia," in Scripta Materialia 39, (1998) 1119-1125, it can be presumed that when the porosity of zirconia exceeds 60%, the thermal conductivity approaches zero. Consequently, a coating with a porosity of more than 60% has excellent thermal barrier performance. In order to attain such excellent effects, a thickness of the coating may be at least 5 μm.

Hereinafter, a detailed description will be given of a method for formation of a TBC on a gas turbine during operation thereof according to exemplary embodiments of the present invention, with reference to the accompanying drawings. Here, the same/similar configurations are defined by the same/similar numerical symbols in all embodiments and description of the configurations which are approximately the same as those in the first embodiment will hereinafter be omitted.

Example 1

Formation of Porosity Coating Layer

This example was conducted using a centrifugal gas turbine with a thrust power of 13 kgf. A turbine wheel with a diameter of about 7 cm was fabricated using Inconel 713, a Ni super-alloy. LPG used as a fuel was evaporated at 50° C. and fed into a combustion chamber through a control unit. Liquid TEOS at room temperature was provided through the other line different from a fuel line such that TEOS was sprayed to flow into the fuel line through an inlet just before the combustion chamber. A revolution speed of the gas turbine was set to 20,000 rpm while an exhaust gas temperature (EGT) thereof was adjusted to 950° C. The number of moles of silicon in TEOS relative to moles of carbon in LPG was 0.1%. TEOS was provided for the first 10 minutes during 100 minutes of operation in order to coat a turbine blade with TEOS.

Figure 1:
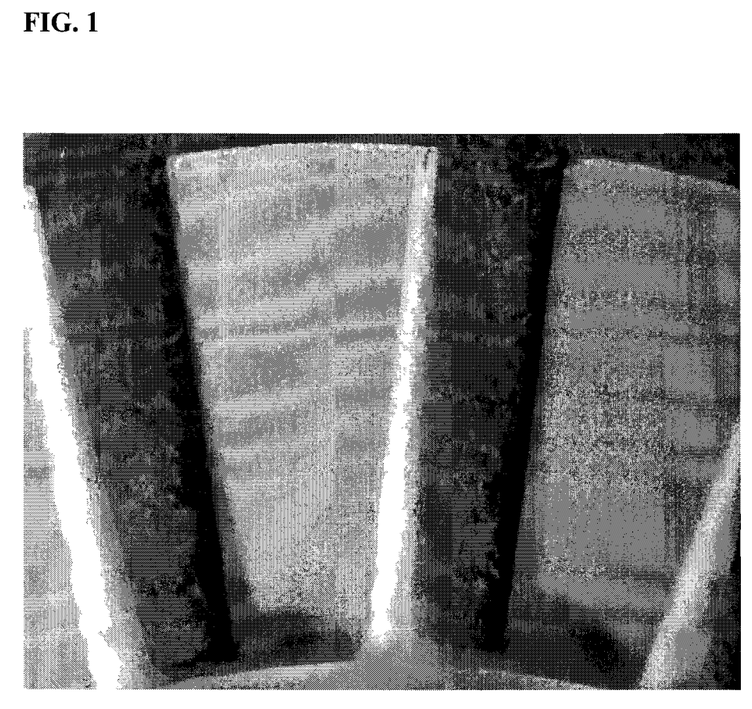
FIG. 1 is an optical photograph showing a pressure side of a turbine blade treated in Example 1 of the present invention.

FIG. 1 is an optical photograph showing a pressure side of the surface-coated turbine blade according to Example 1. From the photograph, it can be seen that the surface of the blade was covered with a white (light blue) coating. This means the coating has a very high porosity.

Figure 2:
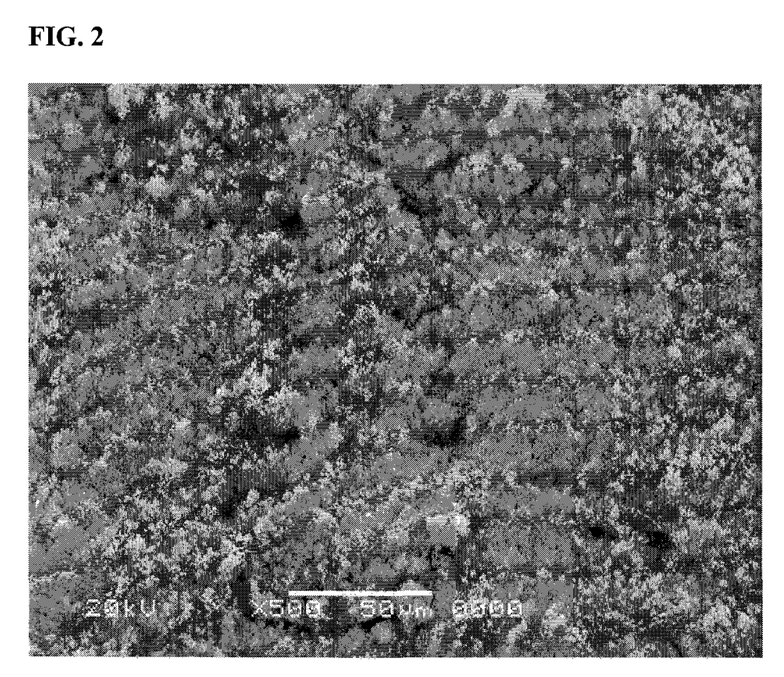
FIG. 2 is a high magnitude scanning electron microscope (SEM) photograph showing a coated surface in a middle portion of the pressure side shown in FIG. 1.

FIG. 2 is an SEM photograph showing the surface of the foregoing coating, wherein the surface of the coating was covered with snow-like nano-scale particles. It was measured that a thickness of the coating is 14 μm while a density is about 0.54. An average porosity of the coating was 80% as calculated using the above measured density and a density of $SiO_2$ of 2.65.

Example 2

Formation of Compact Base Layer

This example was conducted using the same centrifugal gas turbine under the same conditions as described in Example 1, except that the number of moles of silicon in TEOS relative to moles of carbon in LPG was 0.01% and TEOS was provided throughout 100 minutes of operation of the gas turbine in order to coat a turbine blade with TEOS. As a result, a total amount of silicon provided to the gas turbine was substantially the same as that in Example 1.

Figure 3:
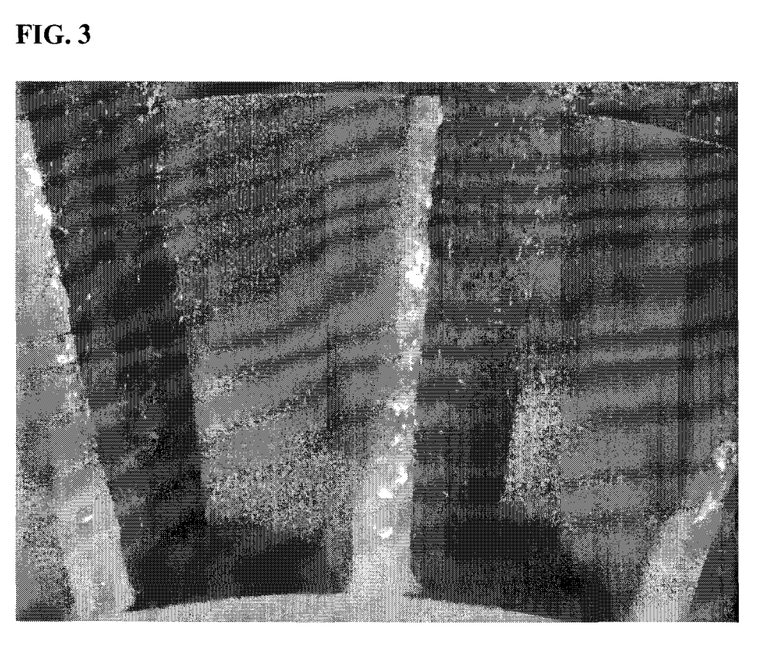
FIG. 3 is an optical photograph showing a pressure side of a turbine blade treated in Example 2 of the present invention.

FIG. 3 is an optical photograph showing a pressure side of the surface-coated turbine blade according to Example 2. As shown in FIG. 3, it can be seen that the surface of the blade was covered with a white coating only at a bottom of the pressure side while a transparent coating was formed in a range from a middle portion to an end of the blade. This result is different from that shown in Example 1.

Figure 4:
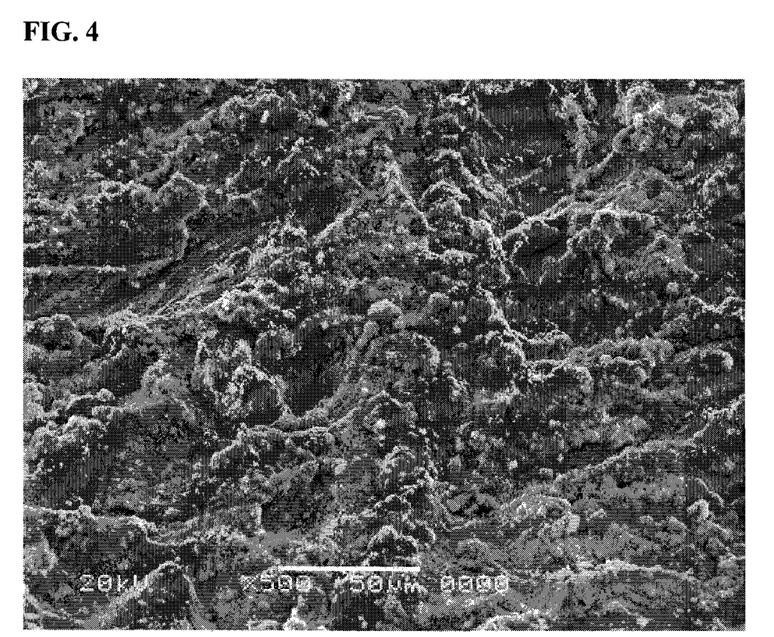
FIG. 4 is a high magnitude SEM photograph showing a coated surface in a center portion of the pressure side shown in FIG. 3.

FIG. 4 is an SEM photograph showing the surface of the foregoing coating. As shown in FIG. 4, no porous coating was observed and a rough surface of a base material was directly exposed. This result is different from that shown in Example 1. Cross-sectional observation revealed a thickness of the formed coating to be about 3 μm.

Example 3

Oxidation Resistance Test

Cutting a blade from each of the coated turbine wheels in Examples 1 and 2, the cut blade was placed in an electric furnace maintained at 1050° C. and was subjected to an isothermal ex-situ oxidation test for 500 hours in order to determine and compare oxidation resistance between both the blades of Examples 1 and 2. Sampling the blade from the electric furnace every 50 hours, the blade samples were cooled to room temperature and subjected to measurement of variation in weight thereof.

Figure 5:
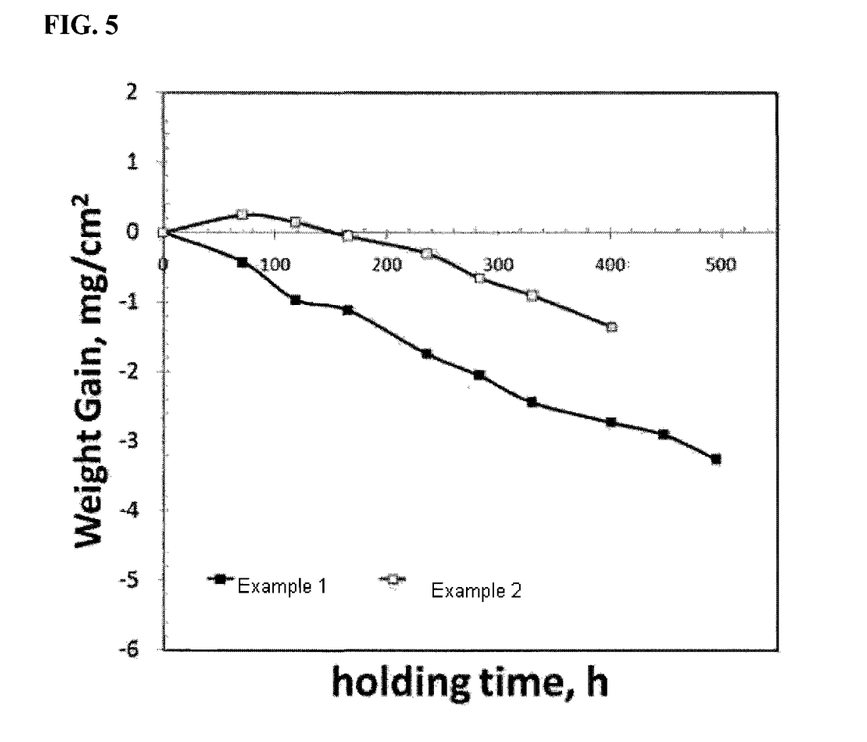
FIG. 5 is a graph illustrating high temperature oxidation results of the turbine blades treated in Examples 1 and 2, according to Example 3.

FIG. 5 illustrates variation in weight of a blade depending on oxidation time, which was obtained from high temperature oxidation results of the turbine blades treated in Example 1 and 2. As illustrated from FIG. 5, the coated blade of Example 2 exhibited superior oxidation resistance (that is, weight reduction rate) to those of the coated blade of Example 1. From this result, it can be understood that the thin and compact coating formed in Example 2 is more preferably used as a base layer in view of oxidation resistance and, when a porous layer is formed on the base layer, heat resistance of the turbine blade (having the base layer as well as the porous layer) may be efficiently enhanced.

Example 4

Formation of Double Layer and Operation Test

The procedures according to Examples 2 and 1 were conducted in sequential order to form a silica layer with a double structure on the surface of a turbine blade and a gas turbine having the coated turbine blade was subjected to operation test at a temperature of 1,200° C. or more in terms of TIT.

Figure 6:
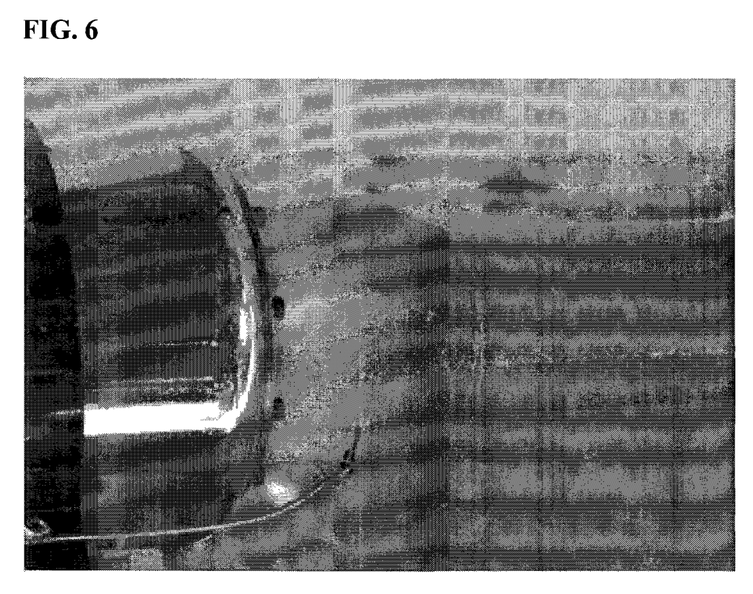
FIGS. 6 and 7 are photographs showing operation results of a gas turbine having a turbine blade treated in Example 4.
Figure 7:
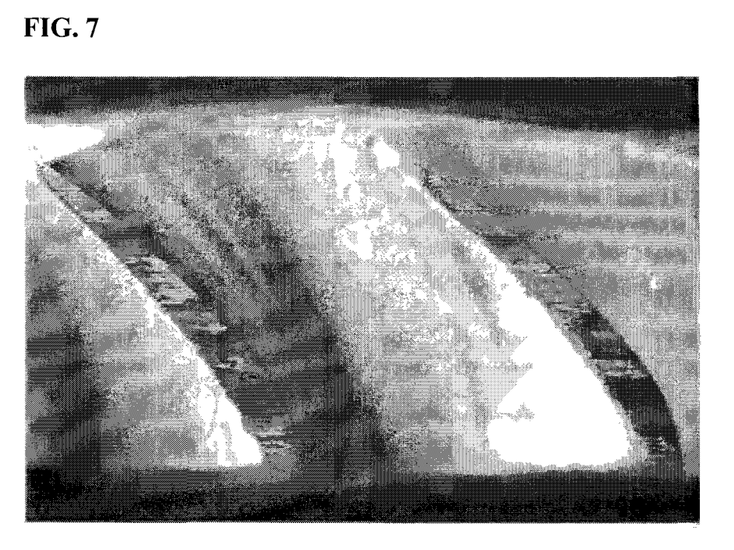

FIGS. 6 and 7 are photographs showing operation test results of a gas turbine having the turbine blade treated in Example 4. In terms of TIT, the temperature increased to 1204° C. and the gas turbine was operated at this temperature for 20 minutes (FIG. 6). On the other hand, blade damage was not observed after the operation although a tip portion was partially worn (FIG. 7).

A method for formation of a TBC on a gas turbine during operation thereof is not particularly limited to configurations or operation modes described in the foregoing examples. Exemplary embodiments of the present invention may be employed alone or in combination of two or more thereof in order to realize different variations of the present invention.

As is apparent from the disclosure, the method for formation of a TBC on a gas turbine during operation thereof according to the present invention may comprise: introducing a desired amount of an organic compound containing silicon into a fuel feed line for a certain period of time; and burning the organic compound together with a fuel, so as to form a double coating which includes a compact base layer with reduced porosity and a high porosity layer above the compact base layer. The formed double coating has remarkably low thermal conductivity, compared to existing zirconia-based TBCs. As a result, for a gas turbine with high revolution speed, the double coating may effectively protect thermal constitutional components of the gas turbine including a turbine blade from a combustion gas and shield heat of the combustion gas, thereby not requiring any further process, apparatus and/or human labor to apply a thermal bather coating material to the components.

Further, as the inventive porous silica coating is further applied to a component having a zirconia-based TBC, the coated component exhibits improved thermal bather efficiency which in turn increases TIT of the existing gas turbine, thereby enhancing thermal efficiency of a gas turbine system. Moreover, when the existing TBC on a gas turbine is damaged, the gas turbine may be coated again by the present inventive method without stopping operation of the gas turbine, regardless of the inventive coating or a TBC employed in manufacturing components of the gas turbine.

Although exemplary embodiments of the present invention has been disclosed for illustrative purposes, those skilled in the art will appreciate that various modifications, additions and substitutions are possible, without departing from the scope and spirit of the invention as disclosed in the appended claims.

What is claimed is:

1. A method for formation of a thermal barrier coating on a gas turbine during operation thereof, the method comprising:
    adding, during the operation of the gas turbine, an organic compound containing silicon to a fuel under a first condition, so as to form a base layer on the surface of a part coming into contact with a combustion gas of the fuel in the gas turbine; and
    adding the organic compound containing silicon to the fuel under a second condition, so as to form, above the formed base layer, a porous layer having more pores than the base layer, wherein:
    the first condition includes the ratio of moles of silicon contained in the organic compound relative to moles of carbon in the fuel ranging from 0.01 to 0.05 mol %, and
    the second condition includes the ratio of moles of silicon contained in the organic compound relative to moles of carbon in the fuel ranging from 0.05 to 1 mol %.

2. The method according to claim 1, wherein both the base layer and the porous layer include silicon dioxide generated by reaction of the combustion gas of the fuel with the organic compound.

3. The method according to claim 1, wherein a thickness of the base layer ranges from 1 to 5 μm.

4. The method according to claim 1, wherein the porous layer has a porosity of 60% and has a thickness of 5 μm or more.

5. The method according to claim 1, wherein the organic compound and the fuel are each independently fed into a fuel combustion space or the organic compound is sprayed into a fuel feed line connected to the combustion space.

6. The method according to claim 1, wherein the organic compound contains oxygen bonded to silicon.

* * * * *